United States Patent [19]

Walliser

[11] Patent Number: 4,950,518

[45] Date of Patent: Aug. 21, 1990

[54] CORE FOR SPOOLING STRIPS OF LABELS

[76] Inventor: Carl J. Walliser, 1112 Windbrooke, Apt. 102, Prairie View, Ill. 60069

[21] Appl. No.: 126,237

[22] Filed: Nov. 27, 1987

[51] Int. Cl.[5] .......................... B32B 7/00; B65H 75/28

[52] U.S. Cl. ...................................... 428/40; 428/35.8; 428/36.9; 428/212; 428/344; 428/354; 428/906; 156/187; 242/74; 242/176

[58] Field of Search ................ 242/1, 7.21, 7.22, 7.23, 242/74, 166, 174, 176; 156/187, 188; 428/36, 40, 41, 42, 195, 196, 344, 35.8, 36.9, 212, 354, 906

[56] References Cited

U.S. PATENT DOCUMENTS

| | | | |
|---|---|---|---|
| 2,578,283 | 12/1951 | Bornemann et al. | 242/74 |
| 2,585,226 | 2/1952 | Christman | 242/74 |
| 3,321,149 | 5/1967 | Andersen et al. | 242/74 |
| 3,503,568 | 3/1970 | Galley | 242/74 |
| 4,102,835 | 7/1978 | Freeman et al. | 242/173 |
| 4,171,831 | 10/1979 | Robinson | 156/252 |
| 4,307,526 | 12/1981 | Wippern | 428/42 |
| 4,309,468 | 1/1982 | Aubin | 428/42 |
| 4,479,316 | 10/1984 | Wippern | 428/42 |
| 4,759,816 | 7/1988 | Kasper et al. | 428/40 |

*Primary Examiner*—Ellis P. Robinson
*Assistant Examiner*—Donald J. Loney
*Attorney, Agent, or Firm*—Eugene F. Friedman

[57] ABSTRACT

A core upon which may be wound a strip of material, more specifically, a strip of labels attached to a liner by an adhesive. The core includes a tube having circular cylindrical symmetry and a coating of a temporary adhesive. The adhesive should have less tackiness than that holding the labels to its liner. In more general terms, the adhesive attached to the tube for holding the web should have a tackiness that should not require a pull force to remove common bond paper from the core of more than about five ounces per inch of width with a 90 degree pull. The adhesive should appear at some axial location over at least 85 percent of the circumference of the tube. Preferably, it will occur on at least 95 percent of the circumference. Making the core involves permanently attaching the adhesive to a tube having cylindrical symmetry. Attaching a web proceeds, after making the core, with contacting the core with the web and then rotating the core about the tube's axis of cylindrical symmetry.

11 Claims, 1 Drawing Sheet

CORE FOR SPOOLING STRIPS OF LABELS

BACKGROUND

Many items of commerce appear in the form of a web wound upon a core. This includes materials varying from movie film to packaging materials. One commodity proving particularly troublesome to spool upon a core takes the form of labels adhered through a pressure-sensitive adhesive to a liner. The prior technique involves simply using a piece of tape to attach the first one or two labels on a strip directly to the appropriate core. This incurs several deleterious consequences. First, the use of the tape generally damages the first couple of labels on the strip. Over a period of time, this results in a substantial loss of material.

Additionally, the use of the tape to attach a strip of labels almost always necessitates a manual operation. The manual handling of the materials concomitantly requires the stopping of automated equipment with the resulting loss of substantial production time and capacity.

U.S. Pat. No. 2,900,868 to C. M. Gaffney, Jr., and 3,084,884 to M. E. Panzer show attaching devices in the form of lengths of material having a pressure-sensitive adhesive which serve to adhere the end of strips, such as movie film, to the hub of a spool. Their use, however, appears cumbersome and requires the mechanical attachment of the film itself of the assisting device.

A magazine for film utilizing a core with a tacky adhesive appears U.S. Pat. No. 2,578,283 to W. Bornemann et al. However, the magazine also required a roller under spring pressure to assure the attachment of the film to the core. Additionally, the core has no use for a strip of labels affixed by an adhesive to a liner.

P. J. Christman, in his U.S. Pat. No. 2,585,221, shows a device for automatically winding a strip onto a number of cores in sequence. An adhesive on the cores serves to attach the strip to each core in turn. Christman, however, does not indicate that the strips may undergo removal from the core without damage, and, in particular, has no utility for spooling lables adhered by a separate adhesive to a liner.

U.S. Pat. No. 3,321,149 to P. M. Andersen et at. attaches a double-sided adhesive strip to a chart roll. Removing a portion of the outer covering of the adhesive strip permits the attachment of a first chart. Upon the removal of that chart, lifting off the second portion of the covering of the adhesive permits the attachment of a second chart. The adhesive forms a permanent bond with the chart roll. As a results, the adhesive can only attach one chart to the roll; the two separate covering portions permit the attachment of two rolls until the necessity of replacing the adhesive. Futhermore, using relatively small segments of the adhesive tape on the roll generally necessitates a manual operation to adhere the chart to the roll with the concomitant loss of time and effort.

H. T. Galley, in U.S. Pat. No. 3,503,568, discloses sections of tape used to adhere photographic film strips to a core. The tape has an adhesive on both sides, with the side exposed to the film having less coverage than the other side. The portion of the side of the tape lacking adhesive helps assure that the film can undergo removal from the core without also removing the tape. However, the attachment of the tape to the core and subsequently of the web to the tape requires substantial manual effort. Furthermore, the adhesive used to attach the film may have a destructive effect upon the ends of film to which it might adhere.

Accordingly, the search continues for a system for adhering elongated strips to a core that will allow automated processing. This should have particular applicability to strips of labels adhesively attached to a liner.

SUMMARY

An automating core should have the ability of automatically spooling a web in the form of an elongated strip. It should also permit the release of the web without imposing deleterious effects upon the web itself.

A core satisfying these objectives includes first a substantially rigid, smooth tube with an outer surface. The tube should display cylindrical symmetry. This means, that an axis of symmetry exists along the tube such that all planes passing transversely to the axis will reveal cross-sections of the tube having the same shape. Mostly commonly, the tube will have circular cylindrical symmetry; in this instance the cross-sections will all have the shape of a circle.

The cylindrically symmetric tube has a temporary, pressure-sensitive adhesive coating permanently adhered to its outer surface. This coating occurs at some axial location on at least 85 percent of the circumference of the tube's outer surface.

The temporary adhesive occurring on at least 85 percent of the circumference of the tube permits the automatic attachment of the elongated strip. The temporary nature of the adhesive permits the facile removal of the elongated strip, even where the strip takes the form of a train of labels adhered to a liner.

The making of the core for spooling a web involves permanently adhering an adhesive to the outer surface of a substantially rigid, smooth tube having cylindrical symmetry. The coating process should assure that the adhesive appears at some axial location on at least 85 percent of the tube's circumference.

To attach the web in the form of the elongated strip to the outside of the tube involves first making the core as indicated above. The web thus contacts the tube with the adhered coating. Finally rotating the tube about its axis of cylindrical symmetry spools the web onto it. This process readily submits to high speed automation.

DETAILED DESCRIPTION

Figure 1:
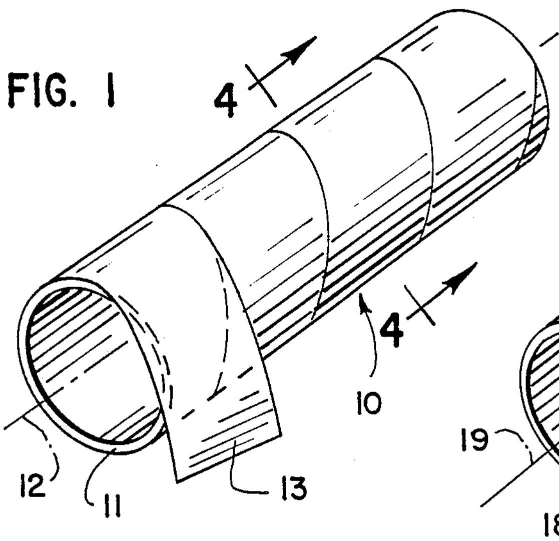
FIG. 1 shows a tube having all of its outer cylindrical surface covered with a temporary adhesive as well as a technique for attaching the adhesive to the tube.

FIG. 1 shows a core generally at 10 composed first of the cylindrical tube 11. The cylindrical symmetry means that an axis exists in which all cross-sections taken at locations along the tube 11 perpendicular to that axis all reveal the same configuration. In FIG. 1, the axis of symmetry 12 runs lengthwise down the center of the tube 11. The tube has circular cylindrical symmetry; thus, each cross-section taken perpendicular to the axis 12 displays a circular configuration.

The cover strip 13 attaches to the core 11 in a spiral fashion. As discussed below, the cover 13 includes a layer of temporary adhesive used to attach an elongated web containing, for example, labels. The cover 13 includes several layers, as discussed below with reference to FIGS. 3 and 7.

Figure 2:
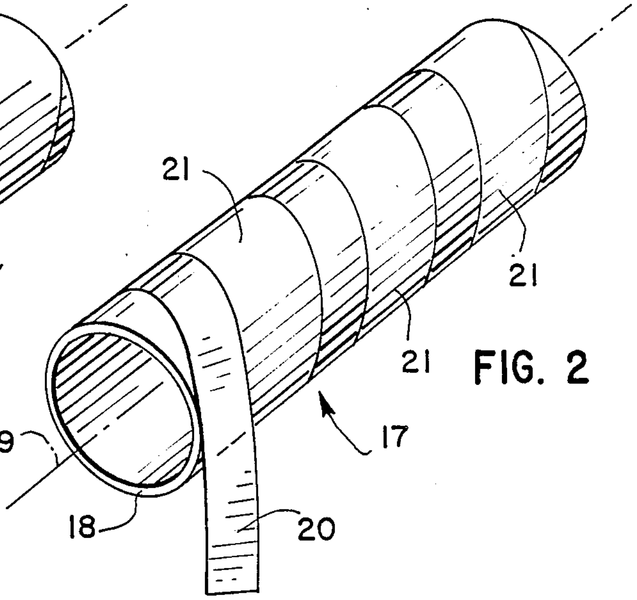
FIG. 2 displays a tube similar to that of FIG. 1 having only a portion of its outer surface covered with a temporary adhesive which, nonetheless, totally circumnavigates the tube.

FIG. 2 includes the core generally at 17 similar to that of FIG. 1. It too includes the tube 18 which also has circular cylindrical symmetry about the axis 19. However, the cover material 20 only provides partial coverage of the tube 18. As seen in FIG. 2, the covering 20 only gives a spiral covering to the tube 18. However, it leaves the bare spots 21 exposed on the tube 18. Thus, as seen, the tube 18 has a partial covering of the material 20 in a lengthwise fashion; travelling from one end to the other along a particular circumferential location on the tube incurs both the covering 20 as well as the bare locations 21. However, each circumferated location going around the outer surface of the tube will find some covering material 20 at at least 5 some axial, or lengthwise, location.

To provide for the automatic attachment of the strip to the core 17, at least 85 percent of tube 18 should have some covering material 20. Thus, the temporary adhesive in the cover 20 should occur somewhere on at least 85 percent of the circumference of the tube 18. Thus, on at least 85 percent of the circumference of the tube 18 will appear, somewhere along its length, some covering material 20 which includes a temporary adhesive. Preferably, at least 95 percent of the circumference of the tube 18 will have the temporary adhesive in the covering material 20 at some axial, or lengthwise, location.

Figure 3:
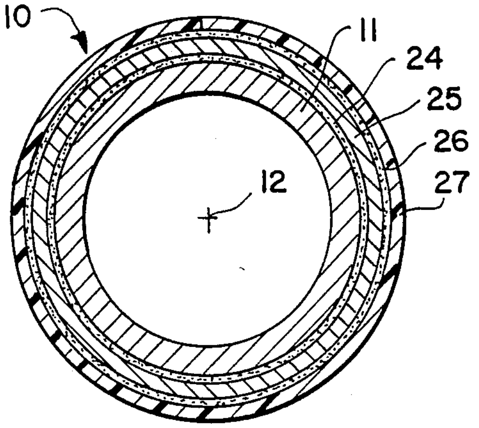
FIG. 3 shows a combination of materials for applying a temporary adhesive to the outer surface of a tube as seen in FIGS. 1 and 2.

FIG. 3 shows the covering material 13 of FIG. 1 which has the same composition as the covering material 20 in FIG. 2. The cover 13 includes first the permanent adhesive 24 which serves to adhere the material 13 to the tube 11. The carrier sheet 25 serves to hold the permanent adhesive 24 on one side. To its other side adheres, in a permanent fashion, the temporary adhesive 26. The double coated linear 27 serves to protect the temporary adhesive 26 until its use.

Typically, the temporary adhesive 26 should have a tackiness that will permit the removal of common bond paper attached to it by using a force for a 90-degree peel of about three to seven ounces per inch of width of paper. While this represents a low tack adhesive, it will generally suffice to hold the strip 28 to the core 10 for a sufficient period of time to spool the former upon the latter. The repositionable acrylic sold under the designation number 1000 by The 3M Corporation of St. Paul, Minn., represents a suitable choice for the temporary adhesive 26.

Additionally, the permanent, pressure-sensitive adhesive 24 could also have a liner. This would protect the permanent adhesive 24 until it finds use in attaching the material 13 to the core 11.

Figure 4:
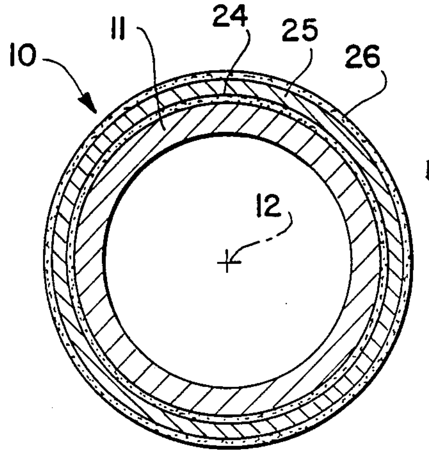
FIG. 4 gives a cross-sectional view along the line 4—4 of the core of FIG. 1.

To attach the covering material 13 proceeds in the fashion suggested in FIG. 1. The material 13, with the permanent adhesive 24 facing downward, adheres to the tube 11. The permanent adhesive 24 serves to retain the remaining other layers in a permanent fashion on the tube 11 as seen in FIG. 4. As shown there, the permanent adhesive 24 bonds permanently to both the tube 11 as well as to the carrier sheet 25. The temporary adhesive 26, in turn, bonds permanently to the carrier sheet 24 and has the double coated liner 27 protecting it.

Figure 5:
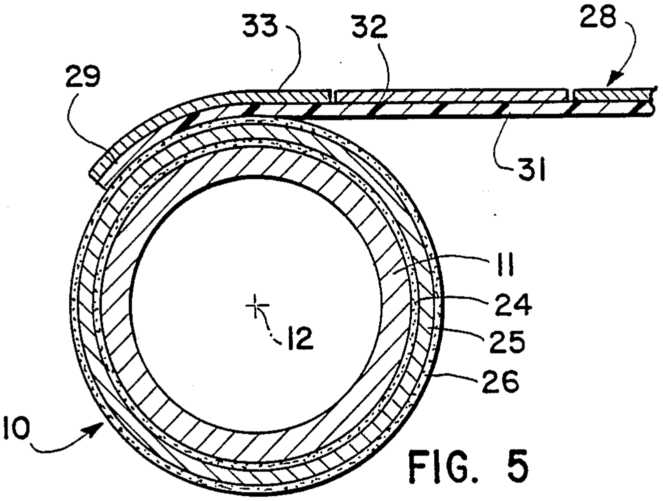
FIG. 5 displays, also in cross-sectional view, the same core as seen in FIG. 4 but with the protective liner covering the temporary adhesive removed.

The liner sheet 27 may be removed from the temporary adhesive 26 to make the core 10 ready for automated or manual use. The configuration of the core 10 without the liner sheet 27 protecting the temporary adhesive 26, which thus becomes exposed for use, appears in FIG. 5.

Figure 6:
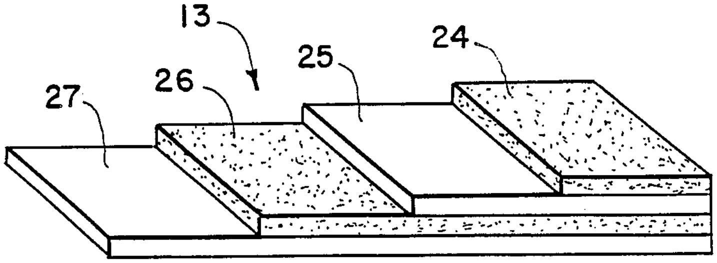
FIG. 6 shows the adherence to the core of FIGS. 4 and 5 of an elongated strip of a train of labels adhered to a liner.

The commencement of the use of the core 10 appears in FIG. 6. There, the strip 28 has begun to attach to the temporary adhesive 26 of the cord 10. In fact, the end 29 of the strip 28 has a temporary bond to the adhesive 26.

The strip 28 includes, in particular, the liner 31 which supports the adhesive 32 to which the labels 33 attach. The labels 33, in particular, may take the form of the sales slips printed by the scales at a supermarket.

FIG. 6 shows the liner 31 undergoing bonding to the adhesive 26. Alternately, the labels 33 may attach to the adhesive 26. The temporary adhesive 26 should generally not interfere with the integrity of the strip 28 composed of the labels 33 bonded to the liner 31. Thus, the adhesive 26 should display less adherence for the liner 31 or the labels 33, to whichever it attaches, then the force of the adhesive 32 holding the labels 33 and the liner 31 together.

Figure 7:
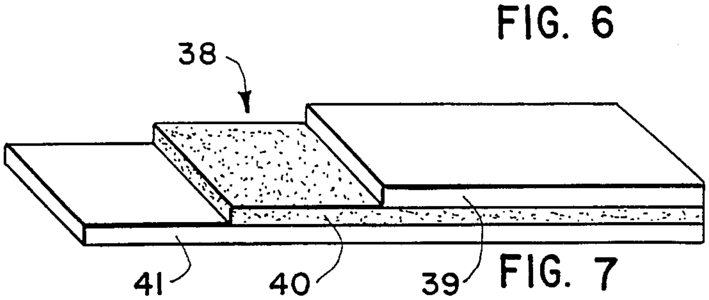
FIG. 7 gives the multilayered group of materials used in an alternate method of placing a temporary adhesive on the outer surface of a tube to form a core.

In FIG. 7 appears the multilayered cover 38 which may find use during the original construction of the tube 11 to form the core 10. Rather than representing material placed upon the completed tube 11, the material 38 becomes part of the core 10 during the original construction of the tube 11. In use, the glue holding the various layers of the tube 11 together will also serve to attach the carrier sheet 39 to the portion of the tube already constructed. This will then leave the layer of temporary adhesive 30 bonded permanently to the carrier sheet 39. The protective covering 41 will then cover and protect the temporary adhesive 40 until its use.

Accordingly, what is claimed is:

1. A core for spooling a web having the form of an elongated strip, said core comprising:
   (A) a substantially rigid smooth tube with cylindrical symmetry and an outer surface; and
   (B) a temporary, pressure-sensitive adhesive coating permanently adhered to the outer surface of said tube, said tube having said coating adhered its outer surface at some axial location on at least 85 percent of the circumference of said outer surface, said adhesive having a tack such that the removal of common bond paper adhered to said adhesive by pulling in a direction at 90 degrees will require less than about five ounces per inch of width of paper.

2. The core of claim 1 wherein said tube has circular cylindrical symmetry.

3. The core of claim 2 wherein said temporary, pressure-sensitive adhesive is located at some axial location on at least 95 percent of the circumference of said outer surface.

4. The core of claim 3 wherein said adhesive, after the attachment and removal of said web to said adhesive, remains substantially completely upon said core with substantially none being removed and remaining adhered to said web.

5. The core of claim 3 wherein (1) said temporary adhesive is a first temporary adhesive; (2) said web includes first and second web sections adhered to each other by a second temporary adhesive; and (3) when said first section of said web is in contact with said first temporary adhesive, the force exerted by said second temporary adhesive between said first and second sections of said web is greater than the force exerted by said first temporary adhesive between said first section of said web and said tube.

6. The core of claim 5 wherein said second section of said web includes a plurality of separate pieces of thin, flexible material adhered to said first section by said second temporary adhesive.

7. A core for spooling a web having the form of an elongated strip and including first and second web sections adhered to each other by a first temporary adhesive, said core comprising:

(A) a substantially rigid smooth tube with cylindrical symmetry and an outer surface; and (B) a second temporary, pressure-sensitive adhesive coating permanently adhered to the outer surface of said tube, said tube having said coating adhered its outer surace at some axial location on at least 85 percent of the circumference of said outer surface, the force exerted by said second adhesive between said first section of said web and said tube, when said first section of said web is in contact with said second temporary adhesive, being less than the force exerted by said first adhesive between said first and second sections of said web.

8. The core of claim 7 wherein said tube has circular cylindrical symmetry.

9. The core of claim 8 wherein said second temporary adhesive is located at some axial location on at least 95 percent of the circumference of said outer surface.

10. The core of claim 9 wherein said second section of said web includes a plurality of separate pieces of thin, flexible material adhered to said first section by said first temporary adhesive.

11. The core of claim 10 wherein said second adhesive has a tack such that the removal of common bond paper adhered to said adhesive by pulling in a direction at 90 degrees will require less than about five ounces per inch of width of paper.

* * * * *